Jan. 28, 1958 B. L. MIMS 2,821,023
CURVATURE GAUGE
Filed Oct. 2, 1953 2 Sheets-Sheet 1
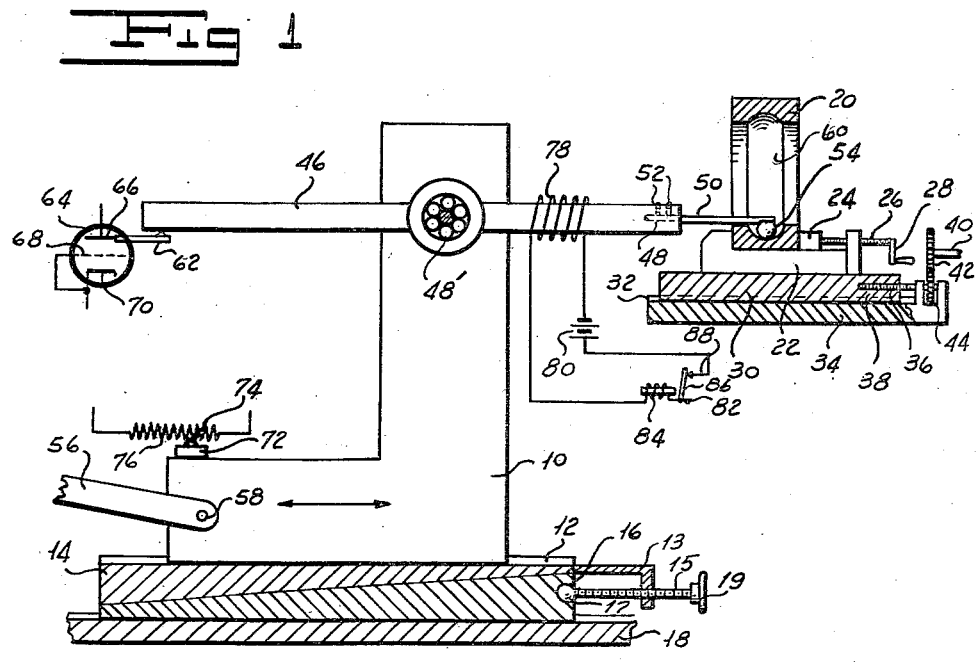
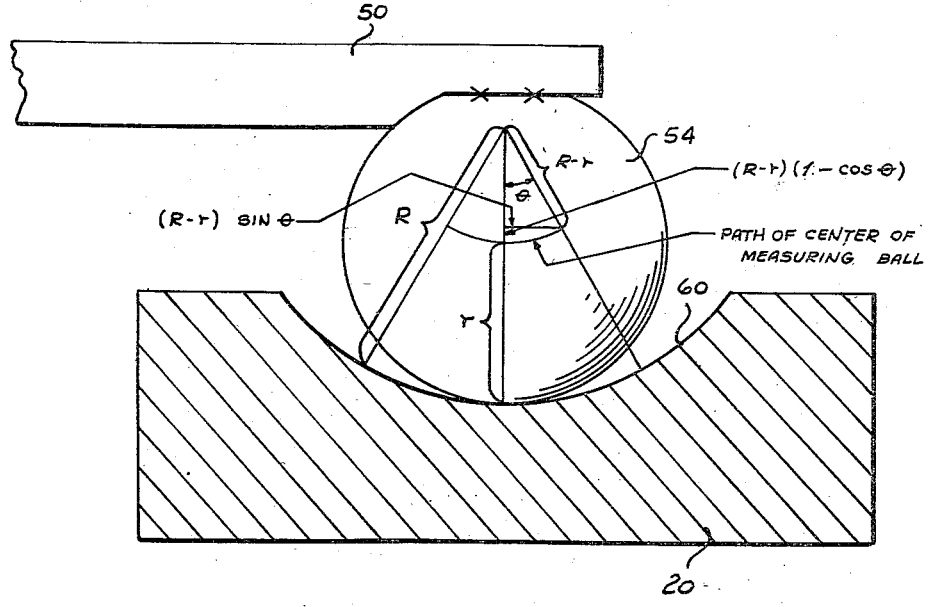
INVENTOR.
BRUCE L. MIMS
BY Henry L. Shenier
ATTORNEY Jan. 28, 1958  B. L. MIMS  2,821,023
CURVATURE GAUGE Filed Oct. 2, 1953  2 Sheets-Sheet 2

INVENTOR.
BRUCE L. MIMS
BY Henry L. Shenier
ATTORNEY

United States Patent Office 2,821,023
Patented Jan. 28, 1958

2,821,023

CURVATURE GAUGE

Bruce L. Mims, Danbury, Conn., assignor to The Barden Corporation, Danbury, Conn., a corporation of Connecticut Application October 2, 1953, Serial No. 383,749

4 Claims. (Cl. 33—174)

My invention relates to a curvature gauge and more particularly to a curvature gauge adapted to measure the curvature of the ball track of the inner and outer races of a ball bearing with a high degree of accuracy.

In the manufacture of ball bearings it is necessary to measure the curvature of the ball tracks in the inner and outer races and to obtain both quantitative and qualitative information concerning the curvature. That is, it is necessary not only to obtain quantitative information concerning the radius of curvature of the track but it is also necessary to detect any irregularities in the track such as hooks, flat spots, lopsidedness, and similar defects. The size of the bearing track as well as whether or not the track has a truly circular cross section must be determined.

One method employed in the prior art to measure the curvature of the track in cross section is to apply a thin film of Prussian blue to the track and then wipe the track with a series of balls or spheres of known size. The curvature can then be judged by an observation of the remaining traces of Prussian blue on the track. This test, however, is not particularly satisfactory, since it is a subjective test which depends for its accuracy, to a large extent, on the skill and experience of the tester. This is especially true when the trueness of the curvature is being judged.

Another method employed in the prior art to judge and measure the curvature of an inner race has been to project the magnified cross-sectional silhouettes of the track on a screen and to compare the projected silhouette with an arc or arcs scribed on a glass plate. While this method is satisfactory for an inner race measurement, it has not proven practicable for outer races having a track formed on their inner peripheries, since there is no readily available method of or means for projecting the outer race track silhouette on a screen.

A third method of the prior art for measuring the curvature of ball bearing tracks in either inner or outer races is to move a ball of known size in short steps across the track being measured. The motion of the ball across the track is then resolved into horizontal and vertical components by mechanical means and the components are plotted to obtain a graphical picture of the curvature. While this method is more accurate than the methods described hereinbefore, it is excessively slow and cumbersome and may require an hour or more for the measurement and plotting of a single track. Moreover, this method also depends for its accuracy on the skill and experience of the person making the measurement.

I have invented a curvature gauge which rapidly and expeditiously measures the cross-sectional curvature of the ball track of either an inner or outer ball bearing race with a high degree of accuracy. My curvature gauge automatically obtains the quantitative information required and provides visual means by which the quality of the track may be readily observed. My curvature gauge does not depend for its accuracy on the skill or experience of the operator and may be used by a person relatively unskilled in the art to measure the curvature of any curved object.

One object of my invention is to provide a curvature gauge which is adapted to measure the curvature of any curved object or surface with a high degree of accuracy.

Another object of my invention is to provide an improved curvature gauge which is adapted to give both quantitative and qualitative information concerning the curvature of the surface being tested.

A further object of my invention is to provide a curvature gauge for rapidly and expeditiously measuring the curvature of the ball track of either the inner or the outer ball race of a ball bearing or both, with a high degree of accuracy.

A still further object of my invention is to provide a curvature gauge for measuring the curvature of a surface which does not depend for its accuracy upon the skill of the operator.

Other and further objects of my invention will appear from the following description.

In general my invention contemplates the provision of a rigid lever pivotally mounted on a carriage arranged for reciprocation on an adjustable support. One end of the lever carries a rigid feeler or ball of known size which is adapted to engage the ball track in the race whose curvature is being measured. The race being measured is mounted in a vise carried by an adjustable support. The ball is of sufficient weight to be maintained in engagement with the track and, as the carriage carrying the lever reciprocates, the ball is slid or wiped across the ball track. It will be appreciated that as the ball moves across the track, the lever rotates about its pivot due to the curvature of the track and its end removed from the ball describes a path which is of the same shape as the path described by the center of the ball, though inverted. A first transducer is arranged to be actuated by this end of the lever so that it generates a signal which is proportional to the vertical position of the ball center. The carriage carries an element adapted to actuate the movable member of a second transducer so that this second transducer produces a signal which is proportional to the horizontal position of the ball center. The signals from the respective first and second transducers are fed to the vertical and horizontal deflecting plates of a cathode ray tube. The cathode beam trace will then be proportional to the movement of the ball across the track and will be a shape which is representative of the quality of the curvature of the track. By comparison of the oscilloscope trace with a trace scribed on the face of the oscilloscope or on a transparent place disposed in front of the face, the quality of the curvature may be judged. The oscilloscope trace may be made to conform with the scribed arc by varying the vertical and horizontal amplification factors of the oscilloscope. I provide a means for varying the amplifications while maintaining their ratio constant so that the position of this means for accomplishing the variation is a quantitative measure of the curvature. My curvature gauge is adjustable so that it may accommodate a wide range of bearing sizes. Different size balls may be mounted on the end of the lever when different size bearings are being used.

In the accompanying drawings which form part of the instant specification and which are to be read in conjunction therewith and in which like reference numerals are used to indicate like parts in the various views:

Figure 1 is a side elevation of my curvature gauge with parts in section, showing the general arrangement of parts.

Figure 2 is a fragmentary side view on an enlarged scale of my curvature gauge.

Figure 4:
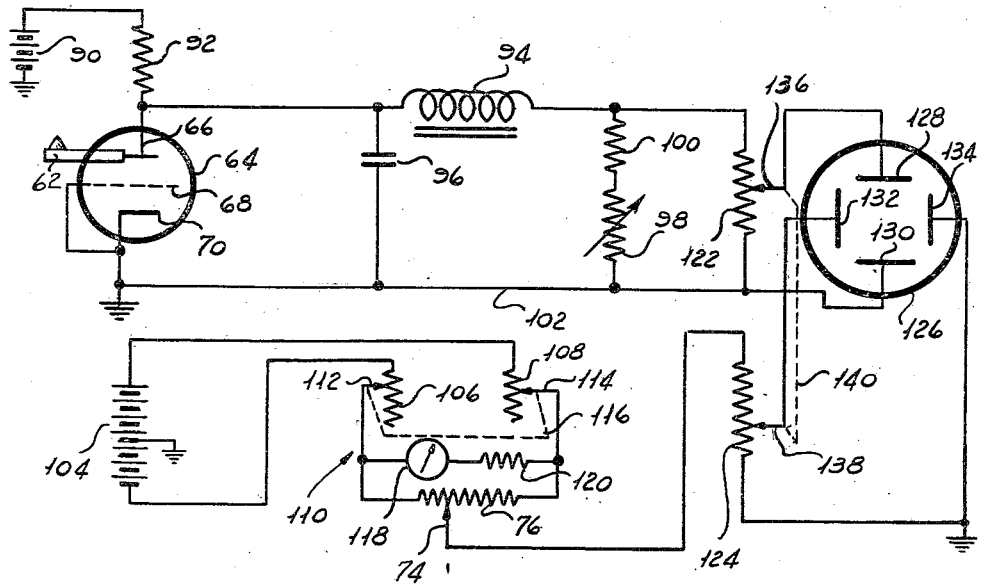
Figure 4 is a schematic view showing the electrical circuits employed in my curvature gauge.

More particularly referring now to the drawings, a carriage 10 is slidably mounted in a track 12 formed in a support wedge 14 carried by a second wedge 16 slidably mounted between a table 18 and wedge 14. An angle bracket 13 is formed on one end of wedge 14 and threadably mounts screw 15 having a ball 17 formed on an end thereof and disposed within a socket formed in wedge 16. Screw 15 has a handle 19 on its end removed from ball 15. As handle 19 is turned in one direction or the other, wedges 14 and 16 move relative to one another to provide a vertical adjustment for carriage 10. A ball bearing race 20 is supported in a vise 22 having a jaw 24 which is moved into engagement with bearing race 20 by a shaft 26 threadably mounted in the vise and actuated by a crank 28. Vise 22 is fixed by any suitable means such as welding or the like to a support 30 slidably mounted in a track 32 on a table 34. A threaded shaft 36 is threaded into a bore 38 formed in support 30 and adapted to be driven by a shaft 40 carrying gear 42 which drives a gear 44 on shaft 36. Shaft 40 is driven by any appropriate means (not shown) and provides a means by which the vise 22 may be adjusted horizontally with respect to the carriage 10. Tables 18 and 34 may be portions of the same table or may be separate tables fixed relative to one another.

Carriage 10 pivotally supports a lever 46 on a ball bearing 48'. One end of lever 46 is formed with a recess 48 adapted to receive a rigid finger 50 held within recess 48 by screws 52. I mount a rigid feeler or ball 54 of a size depending on the size of the race 20 on the end of finger 50 by any convenient means such as welding or the like. It will be appreciated that I may provide a number of interchangeable fingers 50 carrying feelers or balls 54 of various sizes depending on the range of bearing sizes to be tested. A connecting rod 56 is pivotally secured to carriage 10 by a pin 58. Rod 56 is driven from a driven crank (not shown) to provide a means for reciprocating carriage 10 along track 12.

Referring now to Figure 2, it will be appreciated that as carriage 10 and arm 50 reciprocate, the ball 54 will be wiped across the ball track 60 of the race 20. As the ball moves across the track its center will describe the arc of a circle. If the radius of the track 60 is R and the radius of the ball 54 is $r$, the radius of the circle whose arc is described by ball 54 will be $R-r$. I desire to resolve the motion of the center of the measuring ball into horizontal and vertical components. If the ball track includes an angle $2\theta$ the motion of the ball center can be desccribed in polar coordinates as a movement through an angle $2\theta$ at a radius $R-r$. This motion can conveniently be resolved into Cartesian coordinates by means of the diagram of Figure 2. It will readily be appreciated that half the horizontal motion can be represented by $(R-r) \sin \theta$ so that the total horizontal motion will be $2(R-r) \sin \theta$. Similarly the vertical motion of the ball center can be represented as $$(R-r)(1-\cos \theta)$$

The end of lever 46 removed from ball 14 is arranged to engage and actuate the actuating element 62 of a transducer tube 64 in a vertical direction. Tube 64 includes a plate 66, grid 68, and cathode 70. As is well known in the art, the displacement of actuating element 62 is arranged to move plate 66 toward or away from cathode 70 to vary the plate to cathode resistance of the tube and produce an output voltage which is proportional to the displacement of actuating finger 62. In my arrangement the output signal from tube 64 will, therefore, be a voltage which is proportional to $$(R-r)(1-\cos \theta)$$

Similarly, carriage 10 carries an insulating member 72 adapted to actuate the brush 74 of potentiometer resistor 76. As carriage 10 reciprocates and moves brush 74 along resistor 76, as will be explained in detail hereinafter, the transducer including resistor 76 produces an output signal which is proportional to the displacement of brush 74 which in turn is proportional to the horizontal component of the movement of ball 54. Therefore, the output voltage will be proportional to $2(R-r) \sin \theta$.

In order to reduce friction and to prevent "hanging" I provide a means for vibrating the measuring ball 54 as it moves across the ball track 60. To accomplish this purpose I arrange a coil 78 around lever 46, which may be formed from suitable magnetic material. A battery 80 and a buzzer, indicated generally by the reference character 82, are connected in series with coil 78. Buzzer 82 includes an electromagnet 84 and a leaf spring 86 adapted to engage a contact 88. When electromagnet 84 is energized, it pulls arm 86 away from contact 88 thus breaking the circuit to the electromagnet. When the circuit is thus broken, arm 86 springs back to engage contact 88 and re-energize electromagnet 84. Thereby, coil 78 is intermittently energized to restrain lever 46 against reciprocation. This results in a vibration of ball 54 which reduces the friction between the ball 54 and the track 60.

The electrical circuits employed in my curvature gauge are illustrated in Figure 4. The plate 66 of tube 64 is supplied with positive potential from a battery 90 through a resistor 92. The grid 68 of tube 64 is grounded to the cathode 70. Since the vibration produced by buzzer 82 is sufficient to modulate the output signal from tube 64, this signal must be filtered. I connect a simple filter including a series inductance 94 and a parallel capacitance 96 in the output circuit of tube 64. The amplification of the output of tube 64 may be varied relative to the amplification of the horizontal transducer, to be described hereinafter by a variable resistor 98 in series with a resistor 100 connected between choke 94 of the filter and a ground line 102.

The horizontal transducer includes a battery 104 which supplies equal and opposite potentials, respectively to a pair of resistors 106 and 108 of a potentiometer, indicated generally by reference character 110. The resistors 106 and 108 have respective brushes 112 and 114 ganged by suitable means indicated by reference character 116. Potentiometer 110 includes output resistor 76 connected between brushes 112 and 114. A calibrating meter 118 in series with a large resistor 120 is also connected between brushes 112 and 114 to provide a means for calibrating the potentiometer. The ganging linkage 116 provides a means whereby the voltage across resistor 76 may be varied to change the amplification of this transducer relative to that of the vertical transducer. It is to be understood that as brush 74 is moved back and forth across resistor 76 by element 72, the output signal from this horizontal transducer varies.

From the foregoing it will be understood that the signal across the output resistor 122 of the vertical transducer will be proportional to the vertical movement of measuring ball 54. That is, it will be proportional to $$(R-r)(1-\cos \theta)$$

Similarly, the signal appearing across the output resistor 124 of the horizontal transducer, potentiometer 110, is a voltage which is proportional to the horizontal displacement of measuring ball 54. That is, a voltage which is proportional to $2(R-r) \sin \theta$. Therefore I have available at the outputs of the respective transducers a pair of signals which are voltage analogues of the respective horizontal and vertical components of the motion of the center of measuring ball 54.

In order to obtain a visual presentation of this information I provide a cathode ray oscilloscope 126 having respective vertical, 128 and 130, and horizontal, 132 and 134, deflecting plates. I provide resistor 122 with a brush 136 connected to vertical deflecting plate 128 of oscilloscope 126 and resistor 124 with a brush 138 connected to the horizontal deflecting plate 132 of oscilloscope 126. The remaining plates 130 and 134 of oscilloscope 126 are connected to ground as can be seen from an examination of Figure 4. It will be apparent that the resultant trace on oscilloscope 126 will be proportional to the motion of ball 54. Since the qualitative information on the bearing curvature is to be obtained visually, it is preferable that an oscilloscope screen with a high persistence and a low writing rate, such, for example, as a P-7 screen be used.

Generally, the arc described will be an ellipse, but in the case where the horizontal and vertical amplifications are identical the arc will be that of a circle. If a given arc is scribed on the face of an oscilloscope, any number of combinations of horizontal and vertical amplifications will produce a matching trace. If, however, the ratio of vertical to horizontal amplification is maintained constant, only one value of amplification will produce a trace which matches the scribed trace. It will be apparent that, if the amplification ratio is constant, the matching value of amplification will be a function of the radius of the arc described by the center of ball 54, or $R-r$. In order to ensure that the ratio of amplification is maintained constant, I gang brushes 136 and 138 by a linkage 140. The switch associated with linkage 140 can be calibrated in terms of $R-r$ so that the quantitative measurement of the radius of the arc of the ball track may be determined from this indication and the known radius of the measuring ball 54. The qualitative information as to flats, lopsidedness and the like can be determined from an observation of the precision of match between the oscilloscope trace and the scribed circle or ellipse on the oscilloscope. It is to be noted, moreover, I may vary the shape of the oscilloscope trace by varying resistor 98 and potentiometer 110 relative to one another to produce a tall thin ellipse or a short flat one.

By way of example, in one embodiment of my curvature gauge the $R-r$ values range from 0.0065 inch to 0.0140 inch in increments of 0.0005 inch. The $y$-axis amplifications range from 986 to 458 and the amplification ratio is 2.25. If the factor to be measured includes an angle of 80 degrees, the horizontal trace will be 3.66 inches and the vertical trace will be 1.5 inches. The arc of an ellipse is therefore produced which fits well within the undistorted portion of a 5-inch cathode ray tube. It is to be understood, of course, that other amplification and $R-r$ values work equally well under other given conditions.

Figure 3:
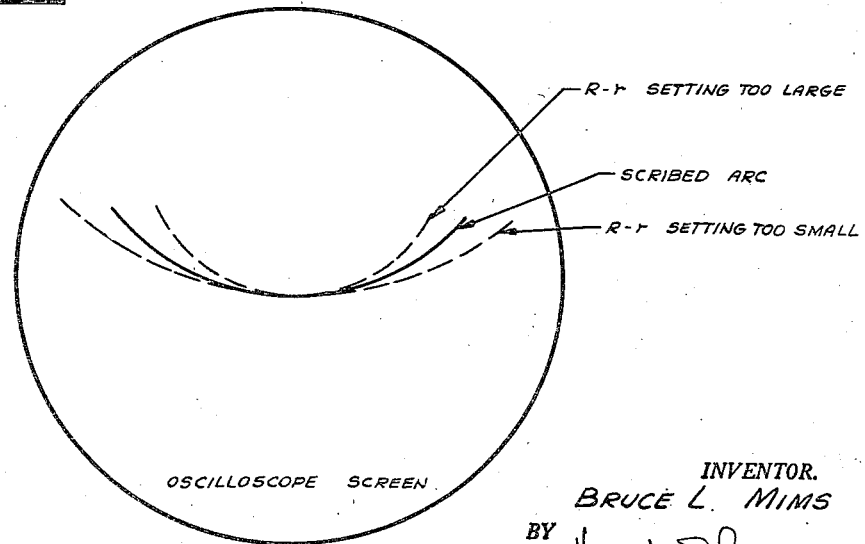
Figure 3 is a view of the oscilloscope screen employed in my curvature gauge showing the relationship between the scribed arc and various oscilloscope traces.

In use I first place a bearing race 20 to be tested within vise 22 and clamp it in place by means of jaw 24. While I have shown an outer race as the race being measured, it will be appreciated that I may measure an inner race as well with a slight modification of the holding fixture. I next select a measuring ball 54 of appropriate size and fix the associated arm 50 within recess 48 by screws 52. Support 30 and carriage 10 are adjusted relative to one another so that the ball 54 lies in the track 60 of the bearing 20 to be measured. As carriage 10 reciprocates in its ways 12, ball 54 moves across track 60 and its center describes the arc of a circle. The end of lever 46 removed from ball 54 describes the arc of a circle which is the inverse of the arc described by the center of ball 54. As this end of lever 46 moves up and down, it actuates finger 62 to vary the distance between plate 66 and cathode 70 of tube 64 so that the tube produces an output voltage which is proportional to the instantaneous vertical displacement of ball 54. Similarly, as carriage 10 reciprocates it moves brush 74 along resistor 76 of potentiometer 110 so that the potentiometer produces an output signal which is proportional to the instantaneous horizontal displacement of ball 54. The variable resistor 98 and linkage 116 are adjusted so that a trace of a shape corresponding to the shape scribed on the oscilloscope face is produced on the oscilloscope screen. It is to be understood, of course, that these adjustments must be made from a known standard such as, for example, grooved plates. The vertical and horizontal amplifications can be set and checked. A trace appears on the oscilloscope face which approximates the scribed curve. The setting of linkage 140 is determined visually so that the trace most nearly approximates the scribed trace. As can be seen by reference to Figure 3, if the $R-r$ setting is too large and a circular arc has been scribed on the face, the trace may be a circle having a radius smaller than the radius of the scribed arc. If the $R-r$ setting is too small, the trace will be an arc having a radius larger than that of the scribed arc. Linkage 140 is then actuated to produce a trace which most nearly coincides with the scribed arc. The quantitative measurement of $R-r$ is read for the dial associated with linkage 140 and the quality of the bearing track surface judged from the closeness of the approximation of the trace with the arc.

It will be appreciated that the action of buzzer 82 in vibrating ball 54 modulates the signals produced by the respective transducers. The filter including inductor 94 and capacitor 96 filters the output signal to eliminate the modulation caused by buzzer 82 in the vertical transducer. Since the amplitude of motion of ball 54 in the horizontal direction is much greater than the amplitude in the vertical direction, buzzer 82 will not seriously affect the signal from horizontal transducer 110. Therefore I have not provided a filter for the horizontal system. It is to be understood, of course, that such a filter could, if desired, be employed.

It is to be understood that any size radius can be measured, up to radii in feet if necessary, so long as measuring balls are available within the range of the transducers. That is, my gauge is independent of the size of R or r and depends only upon $R-r$.

Thus it will be seen that I have accomplished the objects of my invention. I have provided a curvature gauge adapted to measure the curvature of a surface with a high degree of accuracy. My gauge does not depend for its accuracy on the skill or experience of the operator. Moreover, it is adapted to be used with a wide range of bearing sizes. It is particularly adapted for use in obtaining quantitative and qualitative information as to the cross-sectional curvature of ball bearing races and measures the curvature of either inner or outer races with the same ease.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A curvature gauge for determining the degree and quality of the curvature of the ball track of a ball bearing race comprising in combination a lever, means pivotally mounting said lever, means for reciprocating said lever mounting means, a rigid feeler of known dimensions carried by one end of said lever, means mounting the ball bearing race to be measured in a position relative to said feeler where said feeler engages and slides across the ball track as the lever mounting means reciprocates, a first transducer actuated by the end of said lever removed from said feeler to produce an output voltage proportional to the vertical component of the motion of said feeler, a second transducer actuated by said means for reciprocating the lever mounting means to produce an output voltage corresponding to the horizontal component of the motion of said feeler, each of said transducers having an amplifier function means for adjusting the gains of said first and second transducers while maintaining a constant gain ratio and an oscilloscope fed by the voltage outputs of said first and second transducers to produce a trace which is a visual representation of the curvature of said ball track, said oscilloscope having a face provided with a scribed figure of known curvature, the arrangement of parts being such that the setting of said means for varying the transducer amplifications is a measure of the degree of curvature of the ball track and the degree of conformity of the oscilloscope trace with the scribed area is a measure of the quality of curvature of the ball track.

2. A curvature gauge for determining the acceptability of means providing a surface to be tested including in combination a carriage, means for reciprocating said carriage, a lever, means pivotally mounting said lever on said carriage, a rigid feeler carried by one end of said lever and adapted to ride across said surface as said carriage reciprocates, means actuated by the end of said lever remote from said feeler for producing a voltage analogue of the vertical component of motion of said feeler, means actuated by said carriage for producing a voltage analogue of the horizontal component of motion of said feeler, an oscilloscope having respective vertical and horizontal deflecting means and a screen with a face provided with a figure representing the desired curvature of said surface, means for impressing said vertical component voltage analogue on one of said vertical and horizontal deflecting means and means for impressing said horizontal component voltage analogue on the other of said vertical and horizontal deflecting means to produce an oscilloscope trace affording a visual comparison of a surface being tested with said figure of known curvature to determine the acceptability of said means providing the surface to be tested.

3. A curvature gauge as in claim 2 including means for vibrating said lever as it travels across said surface.

4. A curvature gauge as in claim 2 in which said feeler is a ball having a predetermined radius.

References Cited in the file of this patent
UNITED STATES PATENTS

| | | |
|---|---|---|
| 1,840,538 | Simmons | Jan. 12, 1932 |
| 2,171,433 | Powers | Aug. 29, 1939 |
| 2,178,471 | De Bruin | Oct. 31, 1939 |
| 2,190,713 | Hintze | Feb. 20, 1940 |
| 2,249,108 | Beers | July 15, 1941 |
| 2,397,108 | Hanna | Mar. 26, 1946 |
| 2,397,196 | Neff | Mar. 26, 1946 |
| 2,451,155 | De Boer | Oct. 12, 1948 |
| 2,539,027 | Marchant | Jan. 23, 1951 |
| 2,570,298 | Wheeler | Oct. 9, 1951 |
| 2,581,394 | Dinger | Jan. 8, 1952 |
| 2,620,386 | Alspaugh | Dec. 2, 1952 |
| 2,620,655 | Priest | Dec. 9, 1952 |
| 2,648,912 | Osgood | Aug. 18, 1953 |
| 2,691,887 | Rinker | Oct. 19, 1954 |